(12) United States Patent
Lachance

(10) Patent No.: US 6,520,512 B1
(45) Date of Patent: Feb. 18, 2003

(54) SNOW VEHICLE STABILIZER

(76) Inventor: Ghislain Lachance, 471 Des Cedres, St. Elzear, QC (CA), G0S-2J0

( * ) Notice: Subject to any disclaimer, the term of this patent is extended or adjusted under 35 U.S.C. 154(b) by 0 days.

(21) Appl. No.: 09/550,201

(22) Filed: Apr. 17, 2000

(30) Foreign Application Priority Data

Feb. 21, 2000  (CA) ......................................... 2 300 359

(51) Int. Cl.⁷ ................................................. B62B 17/02
(52) U.S. Cl. ..................................... 280/28; 280/28.15
(58) Field of Search ............................... 280/28, 28.14, 280/11.18, 11.12, 21.1, 22, 608, 609, 28.15, 28.16, 14.21, 14.27, 17; 180/182

(56) References Cited

U.S. PATENT DOCUMENTS

| | | | | |
|---|---|---|---|---|
| 3,675,939 A | * | 7/1972 | Vik ........................... 180/182 |
| 3,718,341 A | | 2/1973 | Westberg ..................... 280/28 |
| 3,844,367 A | * | 10/1974 | Flohr ........................ 280/28 |
| 4,077,639 A | | 3/1978 | Reedy ........................ 280/28 |
| 4,082,304 A | | 4/1978 | Kendrena ............... 280/12 KL |
| 4,161,323 A | * | 7/1979 | Wetteland ................... 280/13 |
| 4,193,609 A | | 3/1980 | Bissett ..................... 280/12 K |
| 4,886,283 A | | 12/1989 | Wells ....................... 280/14.1 |
| 5,145,201 A | | 9/1992 | Metheny ..................... 280/609 |
| 5,222,749 A | * | 6/1993 | Bergstrom ................... 280/21.1 |
| 5,344,168 A | * | 9/1994 | Olson et al. ................. 280/28 |
| 5,443,278 A | | 8/1995 | Berto ........................ 280/28 |
| 5,836,594 A | | 11/1998 | Simmons ..................... 280/28 |
| 6,012,728 A | | 1/2000 | Noble ........................ 280/28 |
| 6,086,101 A | * | 7/2000 | Cormican ................... 180/182 |
| 6,102,413 A | * | 8/2000 | Khennache et al. ........... 280/28 |
| 6,105,979 A | * | 8/2000 | Desrochers .................. 280/28 |

FOREIGN PATENT DOCUMENTS

| | | | |
|---|---|---|---|
| CA | 987707 | * | 4/1976 |
| CH | 621979 A5 | * | 3/1981 |
| SU | 755662 | * | 8/1980 |

* cited by examiner

*Primary Examiner*—Brian L. Johnson
*Assistant Examiner*—Christopher Bottorff

(57) ABSTRACT

A stabilizer made of metal or plastic, fit on snow vehicle ski. It comprises a vertical fin forming a wing of a U-shaped section of a length sufficient to cover the bearing surface of the ski. A central channel is placed longitudinally in the centre of the U-shaped section to form with the wings a series of three parallel guides, digging a track on a surface to stabilize the direction of the ski in motion. When applied to a snowmobile ski the central channel is a bar such as used currently to protect the ski in asphalt crossings. Its wings are of steel and have a wall 19 mm high and 2 to 3 mm thick. The web is 56 to 58 mm wide and supports a corrector 6 mm thick and 56 mm wide and stretches on all the ski length. The bar is 6 mm higher than the wings.

14 Claims, 4 Drawing Sheets

SNOW VEHICLE STABILIZER

BACKGROUND

1. Field of Invention

This invention belongs to recreational vehicles particularly the ones having a seat and one or more skis, such as snowmobiles, and particularly snow vehicle stabilisers for directional skis controlling a snow vehicle, be it of a motorised type for use on hilly ground.

2. Description of the Prior Art

U.S. Pat. No. 5,443,278 shows a snowmobile ski. This ski is made of metal. A plastic ski liner is fixed under the ski to reduce the risk of sideswiping. There is an integral fin 17 protruding from the side of the shoe, but only in the centre part of the ski. A bar is present under a liner.

U.S. Pat. No. 5,145,201 is a metal ski for a vehicle having concave longitudinal faces. There are outwardly slightly curved wings 313 and 314 on most of the length of the side of the ski, as far as the folding end. There is also a wear bar under the ski.

U.S. Pat. No. 4,077,639 is a steering keel for a snowmobile ski. It comprises a longitudinal wear bar and cutting edges on the right side of the right ski. The bar is located along a longitudinal central axis under the ski and is designed to penetrate snow.

U.S. Pat. No. 6,012,728 is a snowmobile ski with multiple protruding keels on its underside. The height of the steering keel gradually increases in protrusion, from front end to a central position and may reduce from central position to aft end, but is not high enough to really penetrate snow.

OBJECTIVES

One objective of this invention is to provide a snowmobile ski that helps stabilising the vehicle when sliding on snow and ice and prevent tacking. Another objective is to provide a stabiliser that allows a driver to keep control of a snow vehicle and prevent its sideswiping. More precisely to provide a stabiliser comprising a U-Shaped section with flared wings to be fixed to the raised central portion of a ski in a way that allows the ski to remain in contact with the ground.

BRIEF DESCRIPTION OF THE DRAWINGS

The present invention will be further understood from the following description with reference to the drawings in which.

DESCRIPTION OF THE PREFERRED EMBODIMENT

Figure 1:
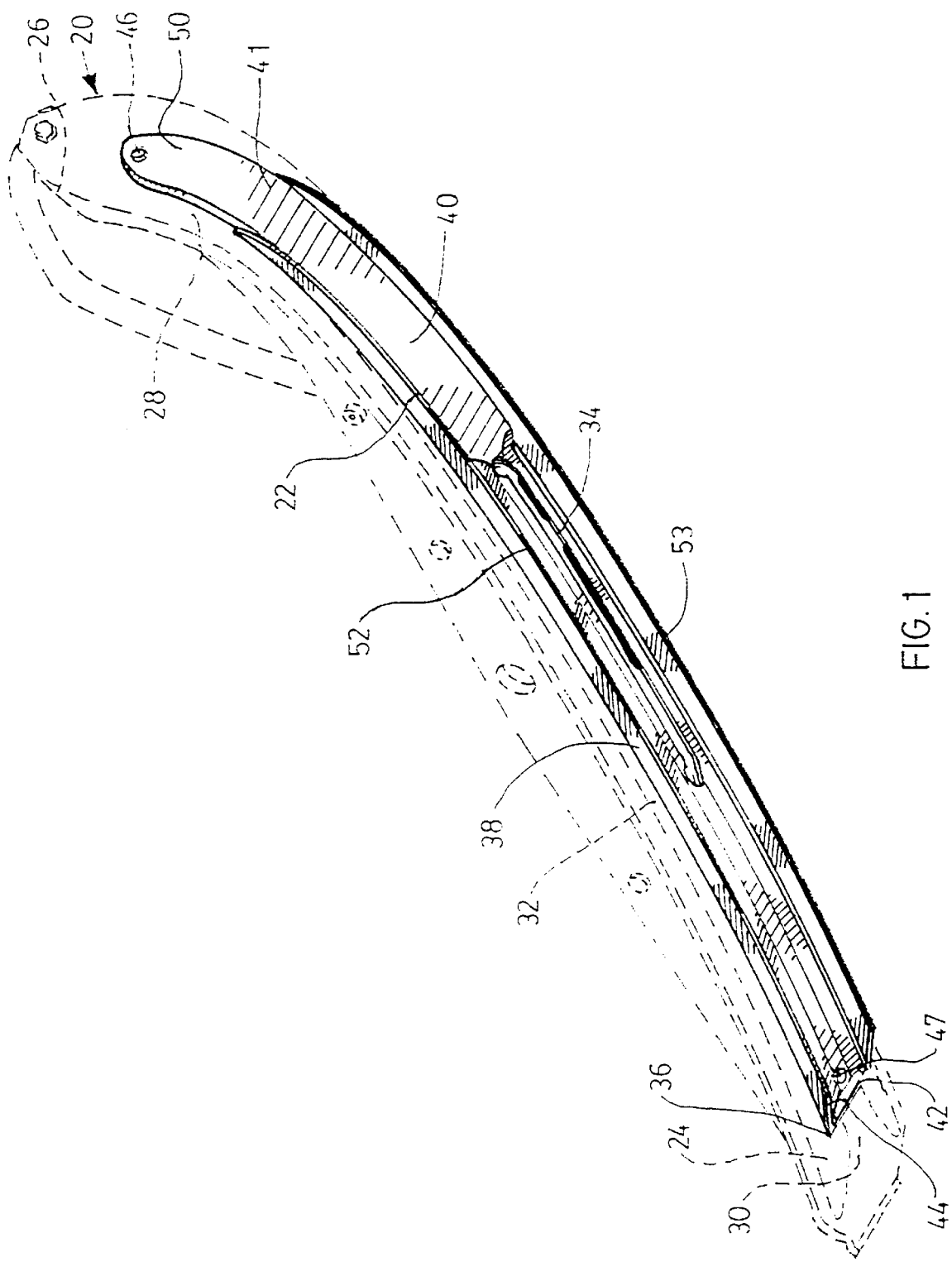
FIG. 1 is a perspective of a ski equipped with the stabiliser.

A preferred embodiment of the invention is illustrated in FIG. 1 where the same numbers identifies the same characterising elements.

FIG. 1 shows the underside of a snowmobile ski 20—in dotted line—, fitted with a stabiliser 22. The stabiliser 22 starts on the rear end, just before the curved part 24, and stretches to the front end 26 of the ski 20, just before a strong curve 28. The stabiliser 22 is placed on an lowered centre channel 30 located in the middle of two carrying sides 32. The lowered centre channel 30 receives a carbide bar 34 that protects the ski 20 when sliding over asphalt. The carbide bar 34 also helps veering when moving on icy surface. The stabiliser 22 has a U-shaped section 36, with wings 38 pointing downward, in order to penetrate snow. Section 36 is made of metal. A corrector 40 is placed on a web 42 of the U-shaped section 36 and comprises a bend 44. A resilient section 41 bears against the front end of a steel stabiliser 22 when the front end 26 of the ski is bent. The corrector 40 may be made of a TEFLON™ or TUVORT type material or of UHMW polyethylene plastic. Front and back bolts 46 and 47 fix the corrector 40 and the stabiliser 22 to the ski 20. The bar 34 is located along the centre of the stabiliser 22. The wings 38 are two (2) to three-(3) mm thick, preferably 2 mm and are 19 mm high. The corrector 40 has an extension 50 at the front and stretches to the front end 26 of the ski.

It is possible to use an L-shaped channel with the short part of the L replacing a wing of the U but it is preferable to have the carbide bar 34 located between the two wings. The carbide bar 34 not only protects when crossing on asphalt roads but facilitates turning when on icy roads because it supports the ski on a single point. A typical height of wing 38 is 18 mm with variations from 6 to 50 mm. The width of the web 42 may be from 25 to 150 mm with typical value at 40 mm. The carbide bar 34 may be of different lengths in order to fit the skis being used by a snowmobile manufacturer. The wings may be covered by carbide plates 52 such as appears on one wing or by a spread of carbide or diamond powder 53 such as is shown on the second wing.

Figure 2:
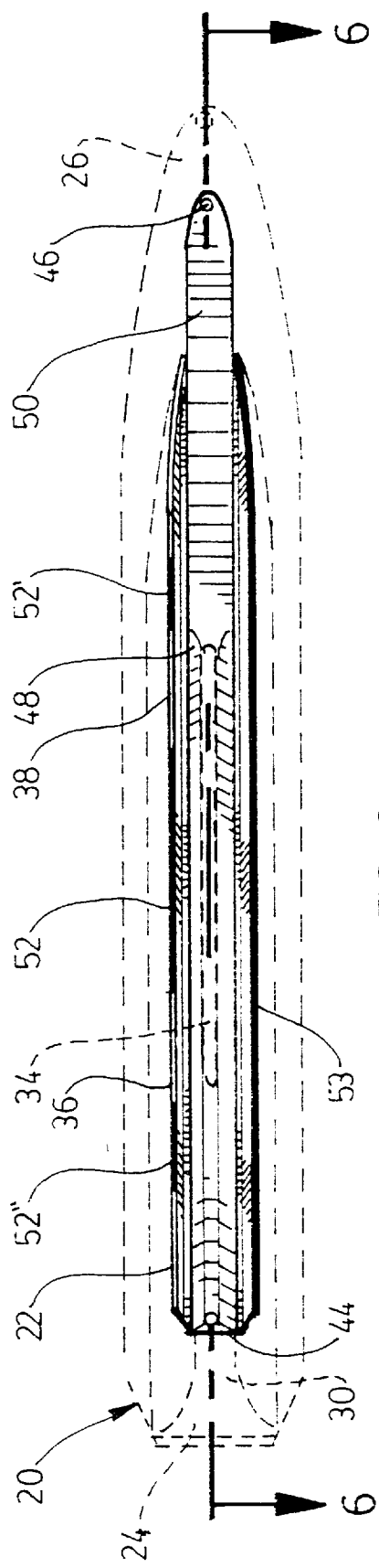
FIG. 2 is a bottom view of the ski of FIG. 1.

FIG. 2 points out the location of the extension 50 of the corrector at the front end 56 of the stabiliser 22 on the underside of the ski 20. The sides of the corrector, at the level of the carbide bar 34 are tapered to form a cavity 48. The carbide bar 34 is shown in dotted lines because it is here part of an existing ski 20. One sees the extension 50 secured in place by the bolt 46. The carbide plates 52, three under each wing 38 protect each wing 38 from abrasion caused by sliding against rough surfaces like asphalt. One may sprinkle diamond powder 53 on all the length of the wings 38. The hardness of quenched steel wings is 40 Rockwell C, carbide plates 58 to 72 Rockwell C; and the carbide powder is of 2 mm in thickness, deposited hot and of a hardness of 74 Rockwell C.

Figure 3:
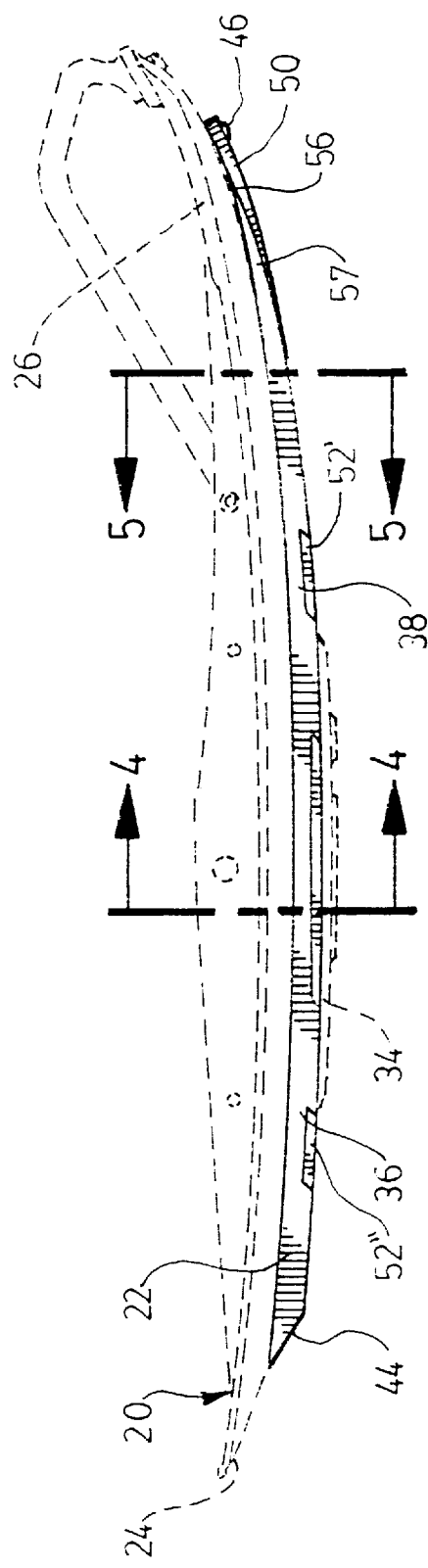
FIG. 3 is a side view of the ski of FIG. 1.

FIG. 3 shows a side of stabiliser 22. The rear end of the U-shaped section 36 terminates with a bevel 44 to coincide with the curved part 24. At the front end 56 of section 36 is a long slope 57, where the height of the wings 38 decrease slowly to follow the strong curve 28 of the ski 20. One should note that the height of the carbide bar 34 topped by a hard knife 35 exceeds by 6 mm the height of the wings 38 over the entire bar's length. The carbide bar 34 by itself without covering comes to the same depth as the lowest part of the wings 38. The length of the bar 34 may vary from one ski to another. The preferred length equals ⅓ to ½ of the length of the stabiliser 22.

Figure 4:
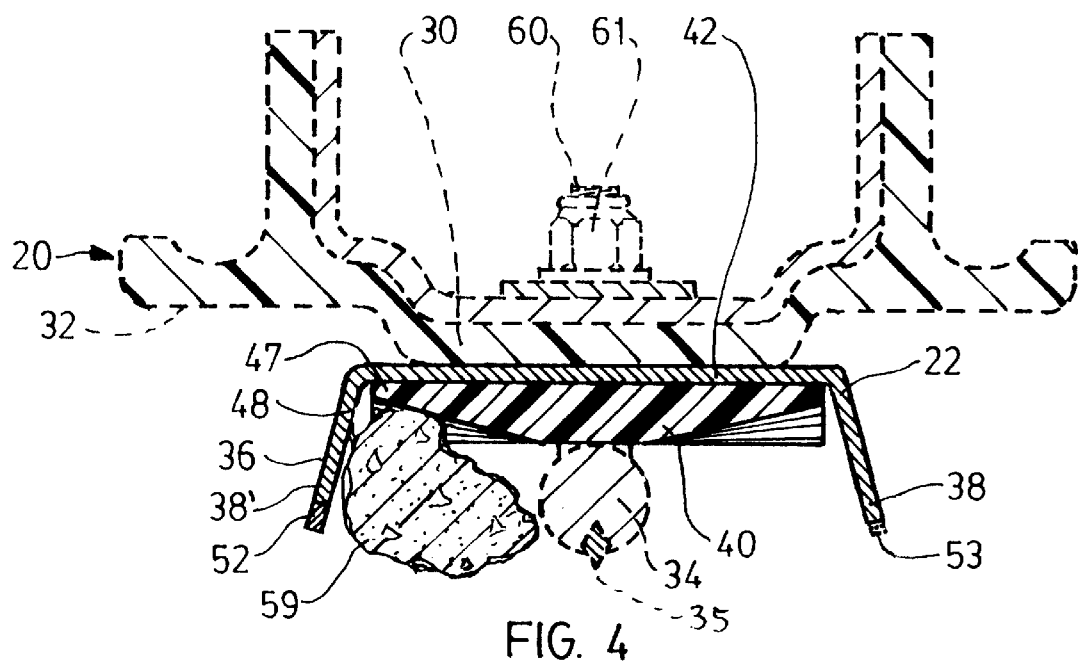
FIG. 4 is a cross-section of the ski according to line 4—4 of FIG. 3.

FIG. 4 shows a section of the ski 20 at the level of the bar 34. One notes that the web 42 of section 36 is larger that the lowered centre channel 30 under the ski 20. The edges 47 of the corrector 40 are also thinner at this level. The thicker part of the corrector is typically six (6) mm thick. The edges 47 coupled with the outwardly sloping wings 38 form two cavities 48 preventing rocks 59 from getting stuck under the stabiliser 22. The second middle bolt 60 holds in place the bar 34 over the corrector 40 and the web 42 together with the lowered centre channel 30. The exceeding part 61 that usually protrudes from the nut in the prior art is being utilised to provide a bolt long enough to assemble all those parts.

Figure 5:
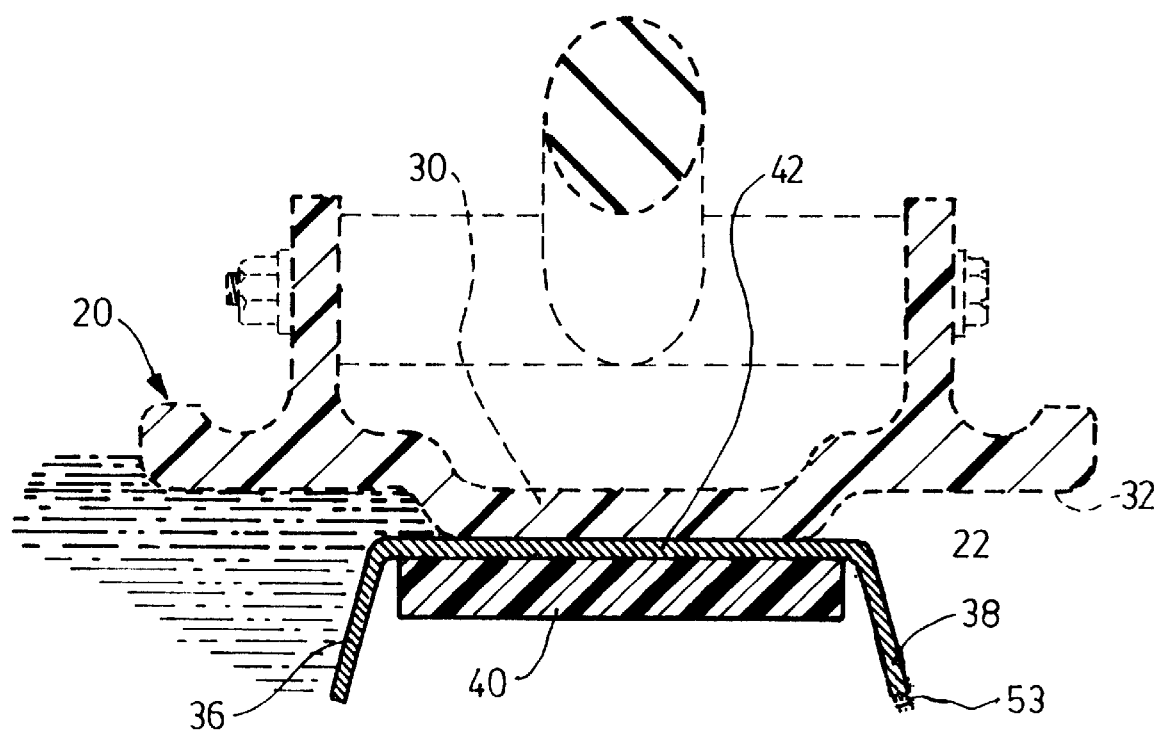
FIG. 5 is a cross-section of the ski according to line 5—5 of FIG. 3.

FIG. 5 is a section of the ski 20 at the level of the front end 56 of the section 36. Here the corrector 40 has the same thickness on all its width. The presence of snow is indicated: in operation, when a driver turns to the left, the left wing of the U-shaped section 36 finds itself perpendicular to the ground and penetrates snow deeply, snow leans against the left carrying side 32, stabilising the ski. One wing 38 shows diamond powder 53 which may be replaced by a carbide powder.

Figure 6:
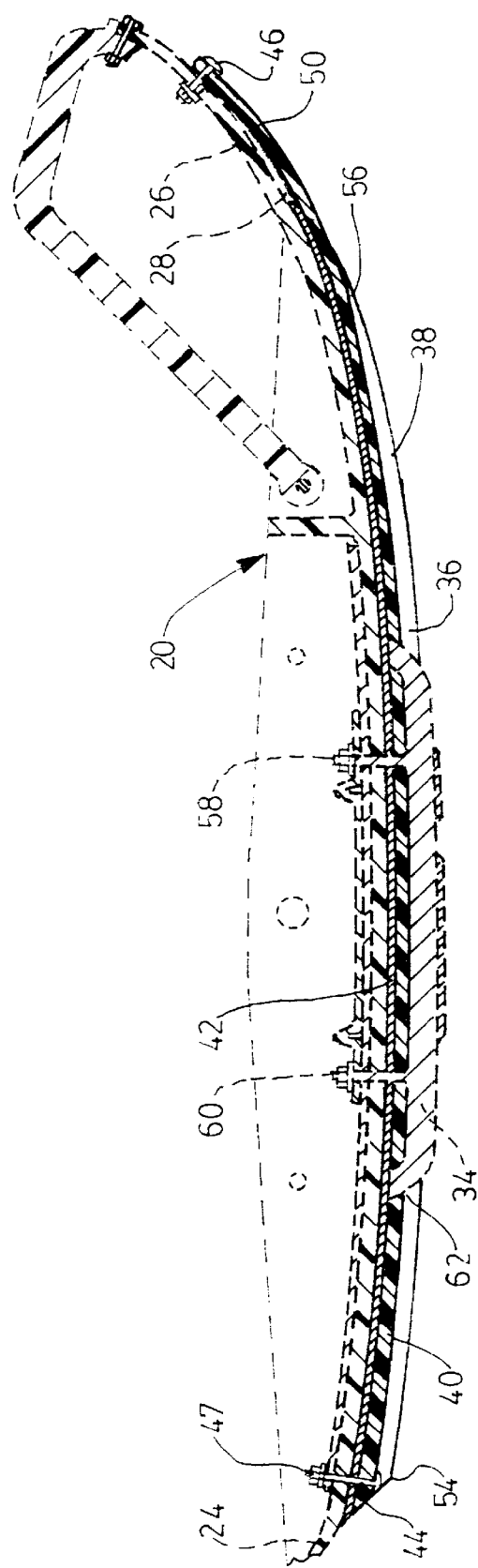
FIG. 6 is a cross-section of the ski according to line 6—6 of FIG. 2.

FIG. 6 is a section of the ski 20. There are four bolts that fix the stabiliser 22 and corrector 40 to the ski 20. The front bolt 46 fixes the extension 50 of the corrector 40 in place. A first middle bolt 58 and a second middle bolt 60 are at the level of the carbide bar 34 and fix both the U-shaped section 36 and the corrector 40. The back bolt 47 is located just beside the slope 44 and fixes both the corrector 40 and the U-shaped section 36. Two receiving holes 62 are practised in the corrector 40 to receive the ends of the carbide bar 34 to prevent twisting of the carbide bar when moving forward or backwards.

Use of the invention, summary:

Generally, in a snow vehicle having a seat and two directional skis where most of the weight is transmitted under the seat, onto a traction or onto a mono ski, thereby leaving a partial weight on the directional skis, the directional skis disposed to form a triangle with the centre of the seat, a U-shaped stabiliser placed under the directional skis controlling the snow vehicle and eliminating tacking.

When the snow vehicle is of a motorised type for use on hilly ground, the stabiliser comprises:
a U-shaped section 36 of length sufficient to cover the bearing surface of the ski 20 and comprising a web 42 and two wings 38,
a carbide bar 34 placed longitudinally at the centre of the ski, along a longitudinal axis of the U-shaped section: the bar is an existing bar placed longitudinally in the centre of the stabiliser 22. The bolts holding this bar 34 are removed to install the U-shaped section 30 and replaced after to form, with the wings 38, a series of three parallel guides, the bar being slightly below the wings. These three guides dig a track on a surface to stabilise the direction of the ski 20, preventing tacking. The bar 34 including a hard knife is preferably 6 mm below the wings 38 and is adapted to bear against a hard surface in preference to the wings for hard roads crossings and makes easier veering on ice. The U-shaped section 36 is preferably of quenched steel and is fixed on the ski 20 by four bolts, two bolts 58 and 60 at the level of the bar 34, one 47 at the end holds the corrector 40 and the stabiliser to the ski, another bolt 46 fixes the extension 50 to the ski 20.

The U-shaped section may be an integral part of the ski or a replaceable part. The web 42 has a width of 30 to 150 mm wide and stretches over most the ski length. The web is preferably 56 to 58 mm wide and comprises a corrector 50, made of UHMW polyethylene type material and 6 mm thick and between 28 and 145 mm, preferably 54 to 56 mm wide and stretches on all the ski length to render centre of U-shaped section smooth for gliding and keeping stabiliser from freezing.

The wings have a variable height of 19 mm more or less 50% depending on depth of corrector 50 and a thickness of 2 to 4 mm to correspond to knives that cut into hard snow to keep a straight path and again to prevent tacking. The wings 38 are oriented slanted at preferably 80 degrees below the horizontal and the corrector 50 comprises a cavity 48 in the area of the carbide bar 34 to prevent rocks 59 from funnelling between the carbide bar and either wing. The wings are made of hard wear resistant material. A quenched steel plate is suitable, so is other material covered with hard facing plates, with carbide plates (52), carbide powder, diamond powder (53) on its upper wall where abrasion occurs.

A replaceable part for use as a stabiliser for snowmobile skis 20 comprising a bearing section having a lowered centre channel 30, a strong curve 28 at the front and a curved part 24 at the back, the stabiliser comprising:
a U-shaped section 36 that covers the bearing surface of the ski, and wider than the width of the lowered centre channel, the U-shaped section comprising a web 42 and two wings 38, a corrector 50 made of UHMW polyethylene type material and having a thickness of 4 to 12 mm and a width of 25 to 125 mm and is adapted to stretch on all the ski length to render centre of U-shaped section 36 smooth for sliding and keep stabiliser from freezing.

Other embodiments are possible and limited only by the scope of the appended claims:

PARTS LIST

20 ski
22 stabiliser
24 curved part
28 strong curve
30 elevation
32 carrying sides
34 carbide bar
36 U-shaped section
38 wings
40 corrector
41 resilient section
42 web
44 slope
46 front bolt
47 back bolt
48 cavity
49 edges
50 extension
52 carbide plates
53 diamond powder
54 bevel
56 front end
57 long slope
58 first middle bolt
59 rock
60 second middle bolt
61 exceeding part
62 receiving holes
120 mono ski
122 seat
124 right side ski
126 left side ski
128 curved front
130 middle part
132 rear
134 sitting portion
136 handle 140 receiving post
142 slot
144 adjustment bolt
146 stability bolt
148 pivot
150 stand
152 front adjustment plate
154 back adjustment plate
155 back pin
156 front pin
158 base
160 bolt
162 curved front
164 strap
166 outer pressure wall
168 inner pressure wall
170 inner fin
172 middle part
174 stabilising plate
176 small plate
178 spring
179 optional fin
180 rod
181 curved edge
182 underside
183 central groove
184 strip
186 outer fin
188 flared end
190 depression
191 finishing angle
192 pivot
193 right angle end
194 eye bolt
195 enlargement
196 higher back hole
198 lower back hole
200 higher front hole
202 lower front hole
204 central bolt
206 middle joint
208 side joint
210 triangular plate
212 hole
214 mono ski groove
216 slide
218 nut
220 washer
222 mini ski central plaque
224 hollow bench
225 thumb sump
226 bump
228 compression spring
230 base
232 seat fin back
234 traction
236 driver

What is claimed is:

1. In a snow vehicle having a seat and two directional skis herein a partial weight is transmitted on said skis, each said ski having a curved fore end, a back end and a slide surface located underneath each said ski, said slide surface having a length and two sides and being supported by a snowy surfaces a stabiliser having a front and a long body installed longitudinally under said slide surface to cut several furrows into said snowy surface in order to diminish side swaying, said stabiliser comprising:

an array of three longitudinal principal cutting elements adapted to remove existing paths and to fashion a virgin snow path, said cutting elements comprising two thin blades disposed externally and a centre cutting element all three elements being at the same depth below said ski, with said centre element comprising means for bearing over hard passages for preventing wear of said thin blades, said stabiliser comprising means at said front to flatten snow between said two thin blades, said stabiliser comprising a slide surface for longitudinal sliding between said two blades, the combination of said three cutting elements of same depth in said flattened snow forcing the snow along said longitudinal sliding, thereby diminishing side swaying.

2. The stabiliser of claim 1 wherein said two thin blades forming with a part of said slide surface a reversed U-shaped section (36) wherein said slide surface defines a web and wherein said blades define two wings said wings being oriented vertically, the lower edge of said wings being adapted to engage into said snow;

said slide surface comprises a corrector (40) made of a sliding material and spread longitudinally over said length of said slide surface to render said web smooth for sliding, insulating and protecting said stabiliser against rapid changes in temperature;

said centre element comprises a carbide bar (34) held by means of bolts longitudinally at the centre of said ski, along a longitudinal axis of said U-shaped section, under said U-shaped section, to form with said wings three parallel guides adapted to dig a track on a snow surface and to stabilise said ski in motion, said carbide bar having a hard knife (35) extending below the lower edge of the blades (38) and being adapted to carry a partial weight when driving over a hard surface, thereby preventing contact of said blades with said hard surface.

3. The stabiliser of claim 2 wherein said carbide bar hard knife (35) is 6 mm below said wings (38) thereby being adapted to bear against a hard surface in preference to said wings.

4. The stabiliser of claim 2 wherein said wings have a height of 11 to 27 mm and a thickness of 2 to 4 mm.

5. The stabiliser of claim 2 wherein said web (42) has a width of 30 to 150 mm wide and said long body stretches over more than half of said slide surface length, said web held against said slide surface with bolts that hold said carbide bar to each ski.

6. The stabiliser of claim 5 wherein said web (42) is 56 to 58 mm wide and comprises a corrector (40), defining a rectangular cross section made of a plastic material and is 6 mm thick and 56 mm wide and stretches beyond said front of said long body, from said curved fore end of said ski, to enact a first flattening of existing furrows in said snowy surface, said rectangular cross section stretching to the start of said carbide bar (34) to render centre of U-shaped section (36) smooth for sliding and keep stabiliser from freezing while also keeping the front part of said wing in contact with said ski when said skis bend on rougher surface and thus preventing any fragments from going between said wings, to provide a smoother ride.

7. The stabiliser of claim 6 wherein said corrector (40) comprises an angular shaped section extending from the start of said carbide bar to the end of said carbide bar and further extending as far as the end of said long body, said angular shaped section creating two additional cutting elements localised between said thin blades and said carbide bar and destined for the passing of stones and hard snow and ice between said thin blades and said carbide bar thereby cutting two additional furrows into said snowy surface in order to diminish said side swaying.

8. The stabiliser of claim 7 wherein said wings (38) are oriented slanted at 80 degrees below the horizontal, and said angular shaped section of said corrector (40) defines a cavity (48) in the area of said carbide bar (34) to prevent rocks (59) from funnelling between said carbide bar (34) and either said wing.

9. The stabiliser of claim 6 wherein said U-shaped section is fixed on said ski by four bolts, two at the level of said bar, one front bolt (46) at the end of said corrector and a back bolt (47) adapted to hold together said stabiliser with said corrector, said corrector extending to the end of said stabiliser and said back bolt uniting said corrector with said ski and said stabiliser.

10. The stabiliser of claim 2 wherein said wings are made of hard wear resistant material comprising quenched steel, a material covered with hard facing plates, carbide plates (52), carbide powder, diamond powder (53) on its lower edges where abrasion occurs.

11. The stabiliser of claim 2 wherein said carbide bar covers between 25 and 60% of said length.

12. A replaceable part for use as a stabiliser for snowmobile skis (20) comprising a slide surface having a slide length, carrying sides (32) having a slide width and a lowered centre channel (30) having a restricted width, said skis having a strong curve (28) at the front and a curved part (24) at the back, said stabiliser comprising:

a U-shaped section (36) that covers said slide surface of said ski, and wider than said restricted width of said lowered centre channel (30) of said ski, said U-shaped section (36) comprising a web (42) of 30 to 155 mm in width and two wings (38) having a wing depth, a corrector (40) installed over said web of said U-shaped section, said corrector comprising a layer of a sliding material on all said ski length to render the centre of the U-shaped section (36) smooth for sliding and keep the stabiliser from freezing, means for providing a carbide bar (34) longitudinally and centrally of said web, said carbide bar being positioned at a depth equivalent to said depth of said two wings and further comprising hard facing means deeper than said depth for providing protection to said wings when exposed to abrasive passages.

13. The replaceable part of claim 12 wherein said corrector is having a thickness of 4 to 12 mm, to permit variations in height of said wings, and a width of 25 to 125 mm and is adapted to stretch on all said ski sliding surface length.

14. A ski for a snow vehicle having a seat and two directional skis wherein a partial weight is transmitted on said skis, each said ski having a curved fore end, a back end and a slide surface located underneath each said ski, said slide surface having a length and two sides and being supported by a snowy surface, defining a stabiliser having a front and a long body installed longitudinally under said slide surface to cut several furrows into said snowy surface in order to diminish slide swaying, said ski comprising:

an array of three longitudinal principal cutting elements adapted to remove existing paths and to fashion a virgin snow path, said cutting elements comprising two thin blades disposed externally and a centre cutting element all three elements being at the same depth below said ski, with said centre element comprising means for bearing over hard passages for preventing wear of said thin blades, said fore end adapted to flatten snow between said two thin blades, said slide surface adapted for longitudinal sliding between said two blades, the combination of said three cutting elements of same depth in said flattened snow forcing the snow along said longitudinal sliding, thereby diminishing side swaying.

* * * * *